United States Patent [19]

Baker

[11] Patent Number: 5,085,075
[45] Date of Patent: Feb. 4, 1992

[54] DEVICE SIMULATING A RUNNING BIRD

[76] Inventor: Ronald D. Baker, 1710 S. Gilbert Rd., #2208, Mesa, Ariz. 85204

[21] Appl. No.: 525,341

[22] Filed: May 16, 1990

[51] Int. Cl.$^5$ ............................................ G01D 13/02
[52] U.S. Cl. ........................................ 73/188; 40/412; 446/199
[58] Field of Search .................... 73/188, 189; 40/412, 40/413, 422; 446/199, 201, 217

[56] References Cited

U.S. PATENT DOCUMENTS

| | | | |
|---|---|---|---|
| 1,628,331 | 5/1927 | Pence et al. | 40/412 |
| 2,573,625 | 10/1951 | Swart | 40/422 |
| 2,711,613 | 6/1955 | Brown | 446/199 |

FOREIGN PATENT DOCUMENTS 196861  5/1923  United Kingdom .................. 40/413

Primary Examiner—Charles A. Ruehl
Attorney, Agent, or Firm—James F. Duffy

[57] ABSTRACT

A device which simulates a running bird, similar to a Road Runner. The device is an assembly of body, tail, neck and head. The tail and neck are pivotally coupled to the body and linked together so as to move together in a complementary fashion. The head is pivotally coupled to the end of the neck and is constrained to rotate about the end of the neck as the neck rotates about its pivotal coupling point with the body. Because neck and tail are linked together to move in complementary fashion, the assembly first simulates a bird with tail, neck and head in an erect, alert position. However, when subjected to a motive force, such as the wind, the tail and neck depress, the head extends forward and the assembly appears to be that of a bird rapidly advancing over the ground. Bird leg simulations add to the effect. Wind driven representations of legs further heighten the effect.

11 Claims, 1 Drawing Sheet

DEVICE SIMULATING A RUNNING BIRD

BACKGROUND

1. Field of the Invention

The invention relates to the field of assemblies which simulate animals. In particular, the invention is an assembly of parts which represents a running bird. The invention may be deemed a lawn ornament, a weather vane, or the like.

2. Prior Art

The prior art is replete with devices for simulating birds and various animals. Carranzaar discloses a rotatable water fowl decoy in U.S. Pat. No. 4,620,385, issued Nov. 4, 1986. Frazer disclosed a radiator cap ornament in the shape of a bird with rotated pivotal wings; this was in U.S. Pat. No. 1,940,490, issued Dec. 19, 1933.

Patents have issued on various other animal types and configurations. However, none of the prior art is known to simulate a bird which moves from a simulated upright, alert position to an elongated position simulating a bird rapidly striding over the ground, much in the configuration of the Road Runner bird.

SUMMARY OF THE INVENTION

The invention is a running bird simulating device. It is made up of an assembly of parts shaped to simulate a bird. The parts include a bird's head, neck, body and tail. The bird's head has a beak. The head is coupled to a first end of the neck. The distal end of the neck is pivotally coupled to the body. In turn, the bird's tail is pivotally coupled to the body as well.

A first linkage couples the tail and the neck such that pivotal motion of either one of the tail or the neck causes a complementary pivotal motion in the other one of the neck or the tail. A motive force is coupled to either the neck or the tail to induce a pivoting motion of the neck or tail with respect to the body.

In a presently preferred embodiment, the motive force is wind power which when coupled to the tail induces a pivotal motion in the tail with respect to the body. When this happens, the first linkage causes a complementary pivotal motion in the neck with respect to the body.

There is a restraining force coupled between the body and at least one of the neck or the tail so as to movably restrain the pivotal motion of the neck and the tail with respect to the body.

Simulated legs are coupled to the body; and, in a preferred embodiment, the simulated legs are rotatingly coupled to the body for rotation under the impetus of wind power applied to the legs.

A DETAILED DESCRIPTION OF THE INVENTION

Figure 1:
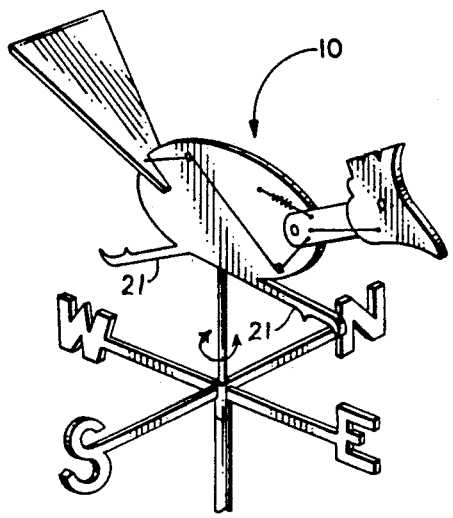
FIG. 1 is a perspective view of the invention which simulates a running bird being used as a weather vane.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 2:
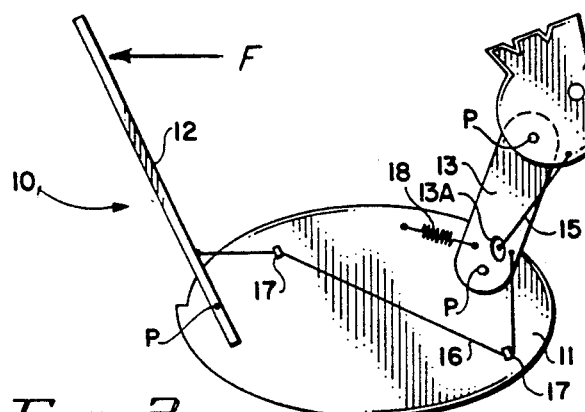
FIG. 2 is an elevation view of the assembly of parts making up the running bird simulating device. The simulated bird has its tail and head raised in an alert position.
Figure 5:
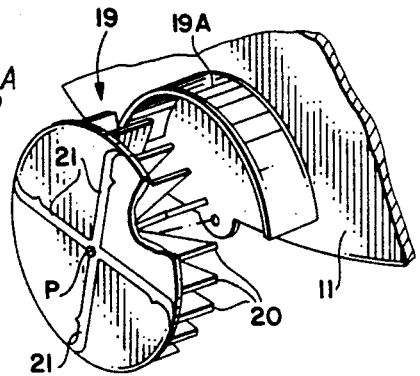
FIG. 5 is a detail of the wind driven bird's leg simulation referred to and illustrated in FIG. 4.
Figure 3:
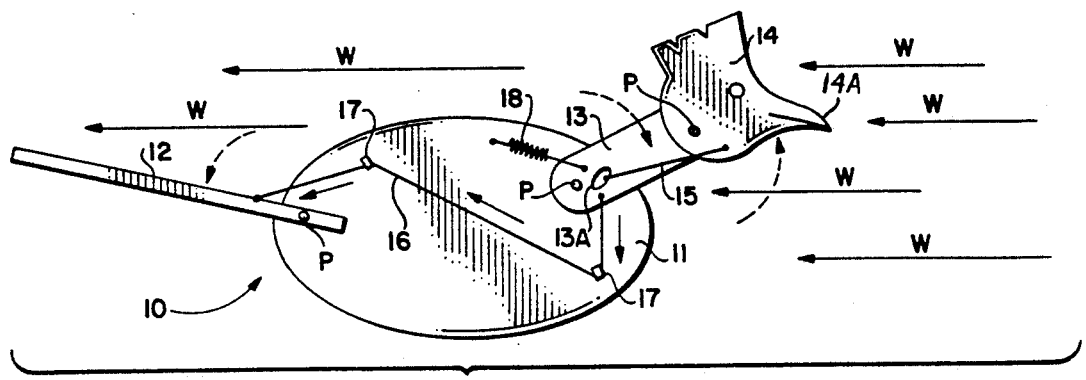
FIG. 3 is an elevation view of the assembly in which the bird simulated has its tail extended downward and rearwardly and its neck rotated downwardly with its head thrust forward as though in the position of a bird running rapidly over the ground.

The invention simulates a running bird 10, shown in FIG. 1, as a weather vane. The bird 10 may just as readily be mounted on a staff on a lawn and be made rotational about that staff or fixed. In order to simulate a running bird it is desired that the assembly of the parts make up the bird 10 shall be movable such that the bird appears to change its stance from an upright, alert position, indicated in FIG. 2, to the configuration of a rapidly striding bird, such as a Road Runner, with its tail depressed, its neck extended and its beak jutting forward, as shown in FIG. 3.

Figure 4:
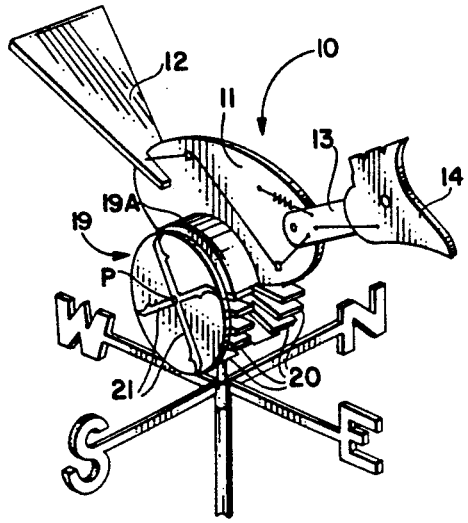
FIG. 4 is similar to the perspective drawing of FIG. 1, but a wind rotatable simulation of a bird's legs has been coupled to the simulated bird's body.

In order to accomplish this change in configuration, the assembly of the bird 10 is made up of various movable parts. In FIG. 2, as well as in FIGS. 3 and 4, the assembly of the bird 10 is seen to comprise a body 11 to which a tail 12 is pivotally coupled at pivot P. The tail 12 may be pivoted from the position shown in FIG. 2 to the depressed position illustrated in FIG. 3.

The assembly includes a neck 13 which is pivotally coupled at a pivot P to the body 11. Neck 13 pivots from a position such as generally indicated in FIG. 2 to a lowered, extended position shown in FIG. 3.

A simulated bird's head 14 is pivotally coupled at a pivot P to the free end of neck 13. Head 14 is capable of pivoting about its pivot point P when neck 13 is depressed from the position illustrated in FIG. 2 to that of FIG. 3. The ability of head 14 to pivot about the end of neck 13 enables the beak 14A of the bird 10 to remain pointed in a forward position even though neck 13 is rotating about its own pivot P. This action wherein the beak 14A remains in a forward pointed direction is seen by comparision of FIGS. 2 and 3.

In order that head 14 does not rotate freely about its pivot point P, a linkage 15 is provided which couples head 14 to body 11 of the bird assembly 10. Linkage 15 is a rigid link whose ends pivot at their points of contact with the body 11 and head 14 respectively of the assembly of bird 10. Thus, when neck 13 rotates from position shown in FIG. 2 to that shown in FIG. 3, the rotation of the neck causes the rigid link 15 to raise the head 14 from a position it would otherwise assume in the course of the rotation of neck 13. Thus, as neck 13 rotates downwardly, the bird 10 appears to be lowering and extending its neck thrusting its head forward and creating a low profile as it moves rapidly over the ground.

The opening 13A in neck 13 prevents interfering contact between neck 13 and the end of linkage 15 where linkage 15 is coupled to body 11.

To complete the simulation of a running bird, it is desirable that the bird's tail 12 should be depressed so that, while the head 14 is thrust forward on a lowered neck 13, the tail 12 is depressed to the rear and approaches a horizontal plane. These positions of tail, head and neck add greatly to the simulation that the assembly of bird 10 is representative of a rapidly running bird, such as a Road Runner.

Since the simulation requires that the tail 12 and the neck 13 move in a complementary manner so as to both become erect when it is not desired to simulate a running bird and to both rotate to a depressed position when it is desired to simulate a running bird, it is necessary that some form of linkage shall couple tail 12 to neck 13. This linkage 16 is illustrated as a flexible cord which runs between tail 12 and neck 13 via two eyelets 17. Eyelets 17 act as guides to direct the line along which tensile forces will be applied through linkage 16. If a motive force F, FIG. 2, is applied to tail 12, tail 12 will tend to rotate about its pivot P pulling linkage 16 with it through eyelets 17 and causing neck 13 to move downwardly until tail 12 and neck 13 assume the positions shown in FIG. 3. If a force were now to be applied to neck 13 so as to raise head 14 upwardly causing neck 13 to pivot about its pivot point P, tensile forces in linkage 16 would cause tail 12 to be raised upwards so that both neck 13 and tail 12 would assume the position shown in FIG. 2.

In the preferred embodiment of the invention, it is desired that tail 12 and neck 13 shall generally be restrained in the upright, alert position illustrated in FIG. 2. This is achieved by means of restraining force, illustrated here as spring 18 which is coupled between body 11 and neck 13. Spring 12, in exerting a restraining force tending to restrain neck 13 in an upright position, causes tail 12 to likewise be restrained in an upright position as a result of the linkage 16 connecting neck 13 and tail 12. When a force F is applied to tail 12, that force is translated through linkage 16 to draw neck 13 downwardly, extending spring 18 and causing both tail 12 and neck 13 to move downward to the position of FIG. 3. When the force F is removed from the tail 12, spring 18 exerts sufficient force to draw neck 13 back up, and by reason of linkage 16, tail 12 is drawn upwardly again to the configuration shown in FIG. 2.

In general, it might be noted that a force could just as well be applied to neck 13 to cause it to rotate about its pivot P and overcome the restraining force of spring 18. In this instance, the weight of tail 12 would cause it to rotate downwardly about its pivot P drawing flexible linkage 16 through eyes 17 in its downward descent.

Ideally, the motive force F, of FIG. 2, will be caused by wind power W, shown in FIG. 3. The narrow configuration of the assembly 10, shown in the perspective views of FIGS. 1 and 4, will provide that the assembly of bird 10 will naturally align itself with the wind so as to present its smallest cross sectional area to the wind W. However, the tail 12 presents a relatively broad cross sectional area to the wind W when the head 14 of bird 10 faces into the wind W. Thus, the force of the wind acting on the tail 12 will cause tail 12 to depress. Wind force will be transmitted through linkage 16 to overcome the resistance of spring 18 and allow neck 13, to be drawn downward. As neck 13 is drawn downwardly, head 14 moves downward with neck 13, but rotates about the end of the neck so that beak 14A is thrust forward. This orientation of head 14 is achieved by means of rigid linkage 15. Thus, it is seen that the bird 10 will move from an upright, alert position, as indicated in FIG. 2, to the elongated, charging position of a rapidly moving land bird, shown in FIG. 3.

To provide an added touch of reality, a pair of extended legs 21, as illustrated in FIG. 1 may be affixed to the assembly of the bird 10. However, added interest is provided if the legs 21 are painted on a wind propelled device 19 which is rotatingly coupled to the body 11 of bird 10. The wind driven device 19 is provided with wind vanes 20 which interact with the wind and cause the device 19 to rotate and present the legs 21 as a blur of motion. A weather shield 19A is shown over the upper regions of the wind driven device 19 so that rotation of the legs 21 is in a preferred direction.

What has been disclosed herein is a device which simulates a running bird, similar to a Road Runner. The device is an assembly of body, tail, neck and head. The tail and neck are pivotally coupled to the body and linked together so as to move together in an complementary fashion. The head is pivotally coupled to the end of the neck and is constrained to rotate about the end of the neck as the neck rotates about its pivotal coupling point with the body. Because neck and tail are linked together to move in complementary fashion, the assembly first simulates a bird with tail, neck and head in an erect, alert position. However, when subjected to a motive force, such as the wind, the tail and neck depress, the head extends forward and the assembly appears to be that of a bird rapidly advancing over the ground. Bird leg simulations add to the effect. Wind driven representations of legs further heighten the effect.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. A running bird simulating device comprising:
    an assembly of parts shaped to simulate a bird including the head, neck, body, and tail of a bird,
    said bird's head having a beak thereon and being coupled to a first end of said bird's neck, the distal end of said neck being pivotally coupled to said bird's body;
    said bird's tail being pivotally coupled to said body;
    a first linkage coupling said tail and said neck such that pivotal motion of one of said tail and said neck causes a complementary pivotal motion in the other one of said tail and said neck;
    said head being pivotally coupled to said neck and further comprising a second linkage coupling said body and said head such that pivotal motion of said neck with respect to said body causes pivotal motion of said head with respect to said neck whereby the orientation of said beak with respect to said body is determined.

2. The device of claim 1 further comprising simulated bird legs coupled to said body.

3. The device of claim 2 wherein said simulated bird legs are rotatingly coupled to said body for rotation under the impetus of wind power applied to said legs.

4. The device of claim 1 further comprising a motive force coupled to at least one of said neck and said tail to induce a pivotal motion therein with respect to said body.

5. The device of claim 4 wherein said motive force comprises wind power coupled to said tail, inducing a pivotal motion of said tail with respect to said body, said first linkage thereby causing a complementary, pivotal motion in said neck with respect to said body.

6. The device of claim 5 further comprising restraining means coupled to said body and at least one of said neck and said tail for movably restraining pivotal motion of said neck and said tail with respect to said body.

7. The device of claim 5 further comprising simulated bird legs coupled to said body.

8. The device of claim 7 wherein said simulated bird legs are rotatingly coupled to said body for rotation under the impetus of wind power applied to said legs.

9. A running bird simulating device comprising:
an assembly of parts shaped to simulate a bird including the head, neck, body, and tail of a bird,
said bird's head having a beak thereon and being coupled to a first end of said bird's neck, the distal end of said neck being pivotally coupled to said bird's body;
said bird's tail being pivotally coupled to said body;
a first linkage coupling said tail and said neck such that pivotal motion of one of said tail and said neck causes a complementary pivotal motion in the other one of said tail and said neck;
simulated bird legs rotatingly coupled to said body for rotation under the impetus of wind power applied to said legs;
said head being pivotally coupled to said neck and further comprising a second linkage coupling said body and said head such that pivotal motion of said neck with respect to said body causes pivotal motion of said head with respect to said neck whereby the orientation of said beak with respect to said body is determined.

10. The device of claim 9 further comprising a motive force coupled to at least one of said neck and said tail to induce a pivotal motion therein with respect to said body.

11. A running bird simulating device comprising:
an assembly of parts shaped to simulate a bird including the head, neck, body, and tail of a bird,
said bird's head having a beak thereon and being coupled to a first end of said bird's neck, the distal end of said neck being pivotally coupled to said bird's body,
said bird's tail being pivotally coupled to said body;
a first linkage coupling said tail and said neck such that pivotal motion of one of said tail and said neck causes a complementary pivotal motion in the other one of said tail and said neck;
said head being pivotally coupled to said neck;
a second linkage coupling said body and said head such that pivotal motion of said neck with respect to said body causes pivotal motion of said head with respect to said neck whereby the orientation of said beak with respect to said body is determined;
a motive force coupled to at least one of said neck and said tail to induce a pivotal motion therein with respect to said body;
restraining means coupled to said body and at least one of said neck and said tail for movably restraining pivotal motion of said neck and said tail with respect to said body; and
said assembly rotatingly coupled to a fixed support and rotatingly responsive to wind forces thereon.

* * * * *